BINARY DIVIDER WITH MULTIPLE FEEDBACK LINES

Filed Oct. 30, 1964 2 Sheets-Sheet 1

INVENTOR.
SAMUEL L. BROADHEAD JR.
BY Moody and Hallacher
ATTORNEYS

BINARY DIVIDER WITH MULTIPLE FEEDBACK LINES

Filed Oct. 30, 1964 2 Sheets-Sheet 2

INVENTOR.
SAMUEL L. BROADHEAD JR.
BY Moody and Kalladar
ATTORNEYS 3,346,728
Patented Oct. 10, 1967

3,346,728

BINARY DIVIDER WITH MULTIPLE FEEDBACK LINES

Samuel L. Broadhead, Jr., Cedar Rapids, Iowa, assignor to Collins Radio Company, Cedar Rapids, Iowa, a corporation of Iowa Filed Oct. 30, 1964, Ser. No. 407,787
8 Claims. (Cl. 235—164)

ABSTRACT OF THE DISCLOSURE

This invention is related to the art of binary division and describes a novel reset feedback arrangement for a cascaded train of binary divider circuits where a multiple switch arrangement enables the adaptation of the binary divider chain to a plurality of countdown factors or countdown ratios defined by a numbering system with radix other than the binary radix 2; such as a system with radix 10 in decade fashion. The countdown factor is changed by injecting the outputs of two bistable binary dividers into a network of output lines. Some of the lines are supplied signals directly from the binary dividers while others are supplied by said dividers through several adder circuits. The output lines feed a plurality of differentiator circuits which actuate said multiple switch arrangement.

This case is a continuation-in-part of application Ser. No. 250,547 filed Jan. 10, 1963 by Samuel L. Broadhead, Jr. now Patent No. 3,155,820.

This invention relates generally to the art of binary division and more particularly to a novel reset feedback arrangement for a cascaded train of binary divider circuits where a multiple switch arrangement enables the adaptation of the binary divider chain to a plurality of countdown factors or countdown ratios defined by a numbering system with radix other than the binary radix 2; such as a system with radix 10 in decade fashion.

The count (number of pulses) at the input of a cascade of binary dividers which is required to provide one output pulse is, in the absence of feedback reset arrangement, equal to $2^n$. Thus, a cascaded arrangement binary divider may be utilized to provide a countdown by powers of 2, 4, 8, 16, 32, etc. For the purpose of the present invention, the term binary divider is given to any one of a number of circuits, such as the well-known "flip-flop" circuit which has two stable modes of operation defined by the conductive states of the input and output sections. A change in the conductive state is brought about by triggering one of the input or output sections to change its conductive state so as to subsequentially reverse the conductive state of the associated section due to cumulative action. Most generally, the trigger is accomplished by the application of a pulse of proper polarity to the conducting section so as to cut off the conducting section and transfer conduction through cumulative action to the associated nonconductive section.

The term binary divider infers the well-known usage of such devices to effect division by repeated subtraction of the divisor from the output.

If it is desired to utilize binary dividers to provide countdown ratios other than powers of 2, a reset feedback system may be employed whereby the input to any divider stage is the normal input plus the outputs of any or all of the subsequent stages. Utilizing this well-known technique in the art, any given cascaded divider chain with a normal countdown of $2^n$ may be modified by the judicious use of a reset feedback system to provide any output countdown ratio less than the normal countdown ratio of $2^n$. These known techniques do not enable a ready means for modifying any given divider chain so as to produce a number of integral countdown ratios with a minimum of circuitry and, more importantly, do not permit a change from one particular countdown to another without time-consuming modification. That is to say, there is lacking in the art, a means for readily altering feedback permutations with a minimum of circuitry so as to arrive at preselected different countdown ratios.

Consider, for example, that a particular divider chain whose normal countdown is in excess of one hundred, is to be adapted to provide one hundred different integral countdown ratios. The output pulse might conceivably be switched into one hundred different feedback combinations so as to produce one hundred changes in dividing factor. While this scheme would lead to the desired end result, it approaches the impractical, due to the complex switch arrangement necessitating one hundred switch positions each with a multiple feedback tie-in to the binary divider chain to produce the changes in dividing factor.

It is an object of the present invention to permit selection of the dividing ratio through judicious feedback of two or more pulses per output cycle with each of the pulses being separated on a time basis and applied individually to associated switching means, each of which effects a change in the dividing factor in steps of a different power of a selected radix. In the above example, the one hundred desired changes in dividing factor may be realized by the employment of two decade (10 position) switches wherein the setting of each of but two switches to ten different positions effects the one hundred changes in countdown ratio as compared to the one hundred switch positions which would normally be required for such an adaptation.

A further object of the present invention is the provision of a versatile binary divider in association with a plurality $m$ of N-position switches by which $N^m$ different feedback combinations and thus $N^m$ different countdown factors, based on the radix N, may be realized by the setting of $m$ switch positions.

A still further object of the present invention is the provision of means to increase the versatility of a binary divider by employing reset feedback as effected by a plurality of switches, each of which effects a predetermined feedback of one of a plurality of time-separated pulses which are not coincident with one another or with those developed in the divider chain.

A feature of the present invention is the employment of a switching arrangement to effect reset feedback permutations in a binary divider chain in a manner such that the dividing factor corresponding to any combination of positions of switches may be read directly as intervals identifying the switch positions.

The invention is further featured in the provision of means for converting each output pulse from a binary dividing chain into a plurality of time-separated pulses for individual application to a like-plurality of N-position switching means through the use of well-known AND circuits and a unique connection of "flip-flop" circuits to a plurality of feedback lines to effect a change in the countdown ratio of the divider.

These and further objects and features of the invention will become apparent upon reading the following description in conjunction with the accompanying drawings, wherein like numbers indicate like elements, and in which.

Figure 1:
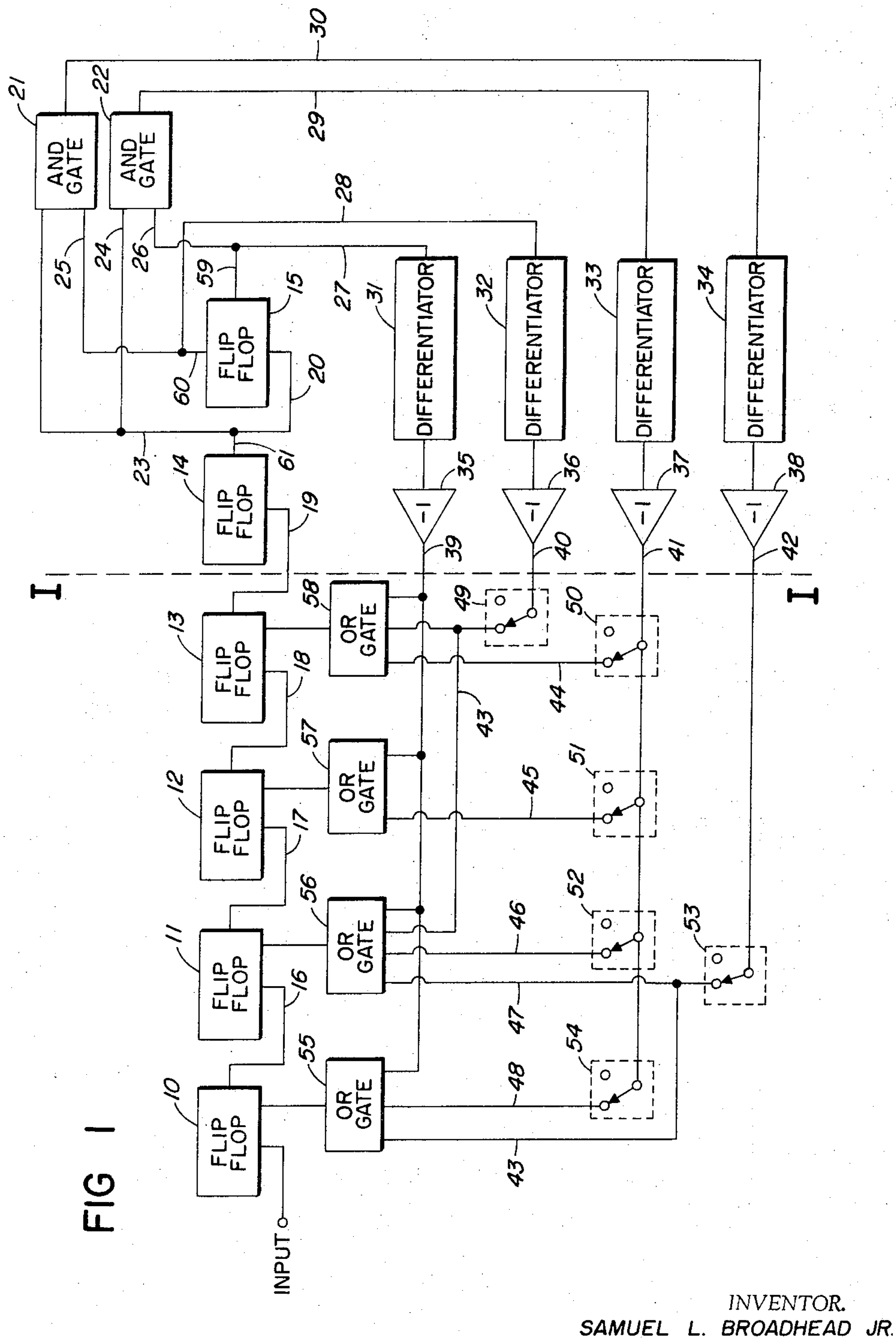
FIGURE 1 is a block diagram showing the inventive concept with a means for reducing the count by 1 to 45 pulses.

FIGURE 1 shows six "flip-flop" circuits 10 through 15 serially connected by lines 16 to 20. The outputs of "flip-flops" 14 and 15 are supplied by various interconnections and AND circuits 21 and 22 to four interconnecting lines 27 to 30. Lines 27 to 30 feed differentiating circuits 31 to 34 respectively, the outputs of the differentiating circuits being fed to inverters 35 to 38 respectively. The output pulses from inverters 35 to 38 are supplied to lines 39 to 42 respectively. A series of OR circuits 55 to 58 are connected to "flip-flops" 10 to 13 respectively. Line 39 is directly coupled to OR circuits 55 to 58. Line 40 is coupled to OR circuits 56 and 58 through a switching mechanism 49. Line 41 is connected to OR circuits 55, 56, 57, and 58 through switching mechanisms 54, 52, 51, and 50 respectively. Line 42 is connected to OR circuits 55 and 56 through a switching mechanism 53. Switching mechanisms 49 to 54 are shown in detail to the copending parent application described hereinabove and therefore need not be shown in detail here. Line 39 reduces the pulse count by 15. Line 40 reduces the pulse count by 10 at "flip-flops" 11 and 13. Line 41 can be switched to any combination of "flip-flop circuits 10, 11, 12, or 13 to subtract either 1, 2, 4, or 8 pulses or any combination thereof. Line 41 can therefore reduce the pulse count by any number of pulses from 1 to 15. Line 42 reduces the pulse count at "flip-flops" 10 and 11 by 5. It is therefore seen that the feedback lines 27 through 30 can be connected through the various switches to reduce the pulse count by any number from 1 to 45. The details of the features described hereinabove are more fully described in the parent copending application identified hereinabove, the teachings of which are incorporated herein.

Figure 2:
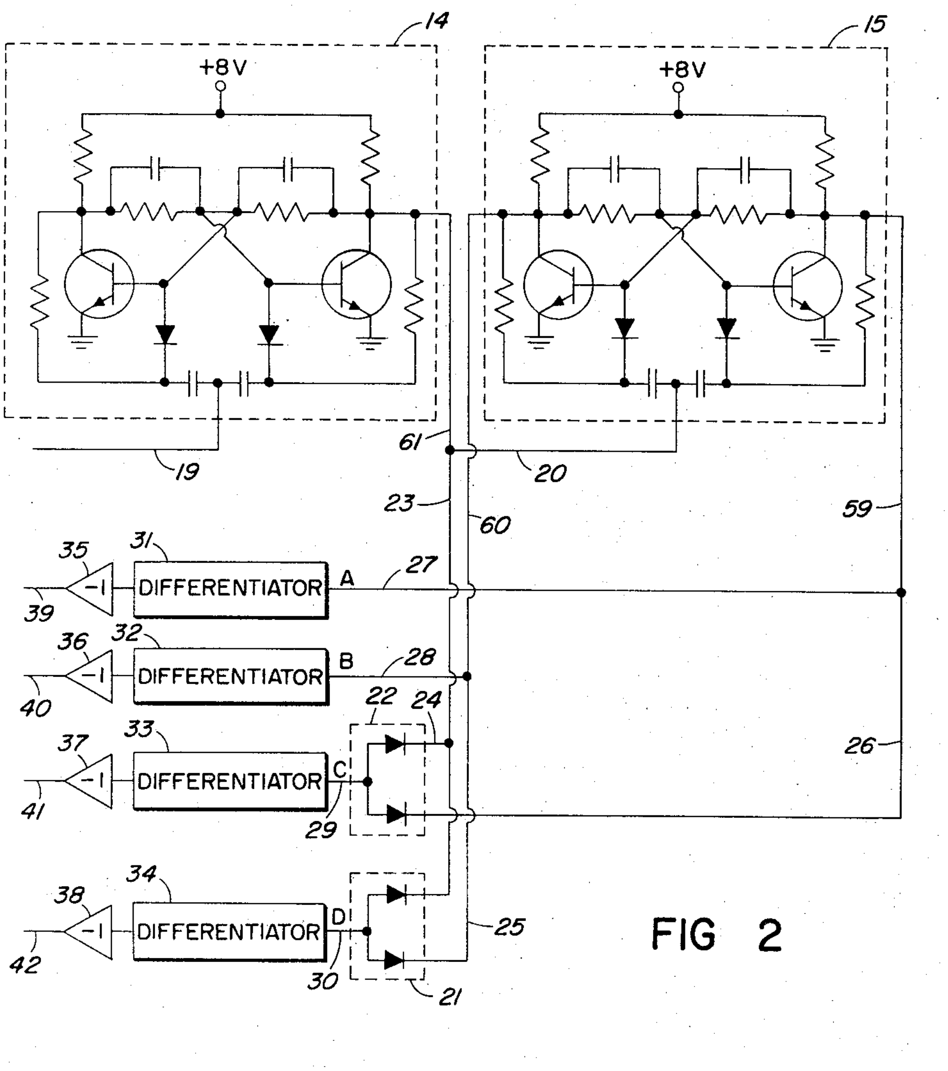
FIGURE 2 is a more detailed showing of the portion lying to the right of line I—I of the circuit shown in FIGURE 1.

FIGURE 2 shows in detail that portion to the right of line I—I in FIGURE 1 which shows the improvement over the system disclosed in the copending case. "Flip-flops" 14 and 15 and their interconnections to differentiating circuits 31 to 34 are schematically shown. The operation of the bistable multivibrator or "flip-flop" circuits 14 and 15 is fully set forth on pages 202 and 203 and FIGURE 198 of Department of Army Technical Manual TM 11–690 entiled "Basic Theory and Application of Transistors" and therefore need not be recited herein.

Figure 3:
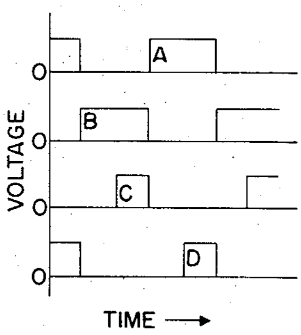
FIGURE 3 shows the time relationship of the pulses supplied to the feedback lines.

The right side of "flip-flop" 14 is directly coupled to the input of "flip-flop" 15 to act as a trigger therefor. The rigth side of "flip-flop" 14 is also shown to be coupled to one side of AND circuits 21 and 22. The left side of "flip-flop" 15 is directly coupled to differentiator 32 and to the second side of AND circuit 21. The right side of "flip-flop" 15 is directly coupled to differentiating circuit 31 and to the second side of AND circuit 22. AND circuits 21 and 22 are coupled to differentiating circuits 34 and 33 respectively. The pulses appearing as the inputs of differentiating circuits 31 to 34 are identified as A, B, C, and D respectively. The time relationship of these pulses is shown in FIGURE 3 where it is noted that the rise sides, identified as A, B, C, and D, of the pulses arrive at the inputs of the differentiating circuits in a time-spaced relationship. The time-spaced relationship of the pulses is essential to the operation of the inventive system in that it is necessary for the pulses to arrive at the "flip-flop" circuits at varying time intervals in order for the reduction of the pulse count to be reduced. Each of the "flip-flops" provides two pulses, each of which go to a different feedback line.

As is well-known, a "flip-flop" has an inherent delay. Therefore the pulses fed to the feedback lines from "flip-flop" 14 are time-spaced from those of "flip-flop" 15. Also the pulses from the two sides of each "flip-flop" are time spaced. It is therefore possible to get four time-spaced pulses from the two "flip-flops". By applying these four pulses to the four feedback lines each of said lines can be used to trigger to binary divider line at different times.

The above description is directed to a system having four feedback lines. The invention is not so limited as a third, fourth, or any number of "flip-flops" can be added to the system to gain an additional two pulses and thereby permit the addition of additional feedback lines.

Although this invention has been described with respect to particular embodiments thereof, it is not to be so limited, as changes and modifications may be made therein which are within the spirit and scope of the invention as defined by the appended claims.

I claim:

1. A circuit for providing a plurality of time-spaced pulses to a network of bistable circuits via an equal plurality of conductive lines comprising: a plurality of pulse generators each providing a first and a second output, a plurality of load devices equal to twice the number of pulse generators, a plurality of adder circuits equal to one half the number of load devices, the outputs from one of said pulse generators going to different ones of said adder circuits, the first output of the other of said pulse generators going to one of said load devices and one of said adder circuits and the second output of the other of said pulse generators going to another of said load devices and another of said adder circuits, and the outputs of each of said adder circuits going to the remaining load devices and means coupling the output of said load devices to said network of bistable circuits.

2. The system of claim 1 wherein said load devices are differentiators.

3. A system for supplying a plurality of time-spaced pulses to a series of cascaded bistable circuits comprising: a plurality of interconnected means for generating pulses, one of said means for generating receiving the output of said bistable circuits, each of said means for generating two outputs, a plurality of lines receiving the generated outputs, the number of said lines being twice the number of said means for generating, a plurality of load devices, the number of said load devices being equal to the number of said lines, a plurality of adder circuits, a portion of said load devices being fed directly from some of said lines, the remaining portion of said load devices being fed from said adder circuits, said adder circuits being fed from the remaining portion of said lines, so that a plurality of time-spaced pulses is supplied to said load devices and means connecting the outputs of said load devices to said series of cascaded bistable circuits.

4. A system for providing $2^n$ time-spaced pulses $n$ being an integer, comprising: $n$ pulse generators, each of said pulse generators providing two output pulses, only $2^n$ conductive paths for receiving said outputs, $n$ adding circuits for adding two of said outputs, the outputs added by each adding circuit being supplied by two of said pulse generators, only $2^n$ load devices, $n$ of said load devices receiving the added outputs from said adding circuits and the remaining $n$ of said load devices receiving $n$ of said outputs from said conductive paths.

5. The system of claim 4 wherein said pulse generators are "flip-flop" circuits and said adding circuits are AND circuits.

6. A system for providing pulse reducing feedback to a binary divider network comprisings: $2m$ feedback lines, $2m+n$ cascaded trigger circuits, and $n$ adder circuits, $n$ of said trigger circuits providing $2m$ pulses, $m$ of said feedback pulses each being fed back to a different one of said trigger circuits through $m$ of said feedback lines, said $n$ trigger circuits each feeding pulses to two of said adder circuits to provide added pulses, said adder circuits feeding said added pulses to the other $m$ of said feedback lines to trigger the other $m$ of said trigger circuits, said feedback lines each being switched by different switching arrangements to subtract a different number of pulses from said binary divider network.

7. The system of claim 6 wherein said trigger circuits are "flip-flop" circuits and said adder circuits are AND circuits.

8. The system of claim 7 wherein $m$ equals 2 and $n$ equals 2.

References Cited

UNITED STATES PATENTS

| | | | |
|---|---|---|---|
| 3,023,371 | 2/1962 | Balish et al. | 331—38 |
| 3,202,837 | 8/1965 | Baracket | 307—88.5 |

MALCOLM A. MORRISON, *Primary Examiner.*

V. SIBER, *Assistant Examiner.*